(12) United States Patent
Huang et al.

(10) Patent No.: US 7,839,734 B2
(45) Date of Patent: Nov. 23, 2010

(54) METHOD AND APPARATUS FOR CONTROLLING SPHERICAL ABERRATION CORRECTION FOR AN OPTICAL DISK DRIVE

(75) Inventors: Chao-Ming Huang, Taipei Hsien (TW); Cheng-Chi Huang, Hsinchu County (TW); Yu-Chen Kuei, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 429 days.

(21) Appl. No.: 12/118,802

(22) Filed: May 12, 2008

(65) Prior Publication Data

US 2009/0279410 A1 Nov. 12, 2009

(51) Int. Cl.
*G11B 7/00* (2006.01)
(52) U.S. Cl. ............... 369/44.32; 369/44.14; 369/112.2
(58) Field of Classification Search ............... 369/44.32, 369/44.14, 53.2, 112.01, 112.02, 44.37, 112.2; 355/52
See application file for complete search history.

(56) References Cited

U.S. PATENT DOCUMENTS

| | | | |
|---|---|---|---|
| 6,570,827 B1 * | 5/2003 | Yamamoto et al. ....... | 369/44.14 |
| 7,706,227 B2 * | 4/2010 | Nishikawa .................. | 369/53.2 |
| 2005/0254394 A1 * | 11/2005 | Nishikawa ............. | 369/112.01 |
| 2005/0270925 A1 * | 12/2005 | Yamamoto et al. ........ | 369/44.37 |
| 2007/0268806 A1 * | 11/2007 | Yamasaki et al. ...... | 369/112.02 |
| 2008/0062391 A1 * | 3/2008 | Uchida et al. .................. | 355/52 |
| 2009/0059745 A1 * | 3/2009 | Kikuchi .................... | 369/44.32 |

FOREIGN PATENT DOCUMENTS

JP 10135675 5/1998

OTHER PUBLICATIONS

English language translation of abstract of JP 10135675 (published May 22, 1998).

\* cited by examiner

*Primary Examiner*—Thuy N Pardo
(74) *Attorney, Agent, or Firm*—Thomas, Kayden, Horstemeyer & Risley

(57) ABSTRACT

The invention provides a method for controlling spherical aberration correction for an optical disk drive. First, a collimator lens is moved to a first target position for spherical aberration correction. A driving time of motion of the collimator lens is then calculated. A prohibiting time is then determined according to the driving time. The collimator lens is then prevented from moving until the prohibiting time elapses.

19 Claims, 4 Drawing Sheets

METHOD AND APPARATUS FOR CONTROLLING SPHERICAL ABERRATION CORRECTION FOR AN OPTICAL DISK DRIVE

BACKGROUND OF THE INVENTION

1. Field of the Invention

The invention relates to optical disk drives, and more particularly to spherical aberration correction of optical disk drives.

2. Description of the Related Art

A perfect lens focuses all incoming rays to a point on the optic axis. A real lens with spherical surfaces, however, focuses rays more tightly if they enter it far from the optic axis than if they enter closer to the axis. The real lens with spherical surfaces therefore does not produce a perfect focal point and suffers from spherical aberration.

An optical disk drive has a pickup head comprising a lens. The pickup head emits a laser beam, focuses the laser beam on a surface of an optical disk with the lens, and detects a reflection of the laser beam to read data stored on the surface of the optical disk. Because the lens of the pickup head is a real lens, the laser beam is not perfectly focused on the surface of the optical disk due to spherical aberration, inducing difficulties in data determination according to the reflection beam.

When an optical disk drive accesses conventional optical disks with a low data density such as DVDs, spherical aberration is ignored because the data density on the DVD disk and the required precision for data reading/writing are not so high, therefore the optical disk drive can correctly determines data according to refection beams with spherical aberration. When an optical disk drive accesses optical disks with a high data density such as HD-DVDs or Blu-ray Discs (BD), spherical aberration must be corrected. Otherwise, an optical disk drive cannot correctly determine data according to refection beams with spherical aberration. Thus, spherical aberration correction is required for optical disk drives accessing disks with high data density.

A conventional method for correcting spherical aberration is to move a collimator lens of a pickup head with a stepping motor. When the pickup head operates, heat is generated and the temperature is increased, causing damage to the mechanism of the stepping motor. If the mechanism of the stepping motor is severely damaged, the stepping motor cannot normally operate to correct spherical aberration, and the pickup head cannot correctly access data. Thus, a method for controlling spherical aberration correction with overheat protection is required.

BRIEF SUMMARY OF THE INVENTION

The invention provides a method for controlling spherical aberration correction for an optical disk drive. First, a collimator lens is moved to a first target position for spherical aberration correction. A driving time of motion of the collimator lens is then calculated. A prohibiting time is then determined according to the driving time. The collimator lens is then prevented from moving until the prohibiting time elapses.

The invention provides an apparatus for controlling spherical aberration correction for an optical disk drive. In one embodiment, the apparatus comprises a control unit and a timer unit. The control unit calculates a driving time of motion of the collimator lens, determines a prohibiting time according to the driving time, sets a timer value of the timer unit for the prohibiting time, and controls a collimator lens actuator to move the collimator lens for spherical aberration correction when the timer value is equal to or less than zero. The timer unit decreases the timer value as time elapses after the timer value is set to the prohibiting time.

The invention provides an optical disk drive. In one embodiment, the optical disk drive comprises a colliminator lens actuator and a spherical aberration correction module. The colliminator lens actuator moves a collimator lens for spherical aberration correction. The spherical aberration correction module calculates a driving time of motion of the collimator lens, determines a prohibiting time according to the driving time, and prevents the collimator lens from moving until the prohibiting time elapses.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
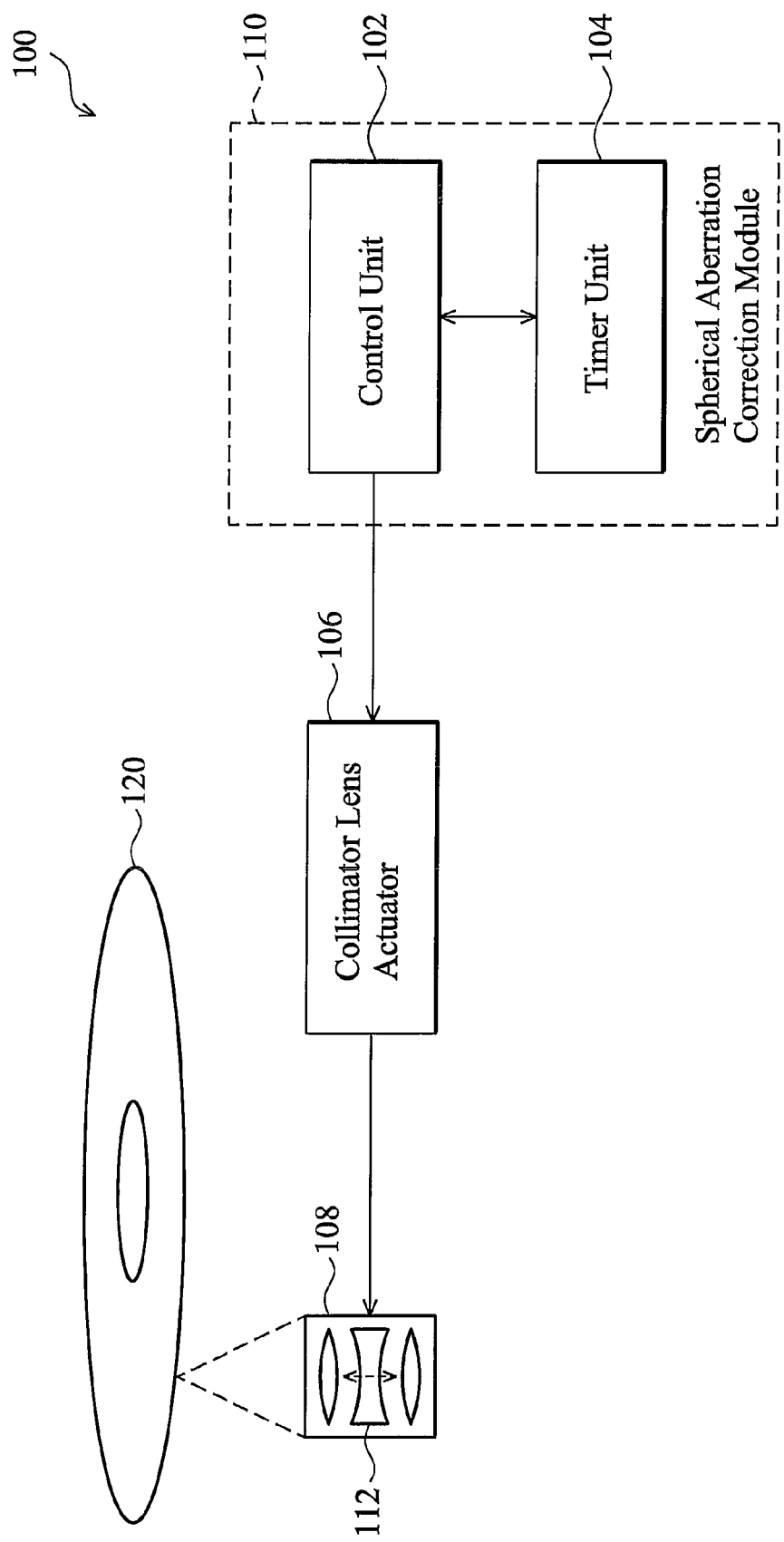
FIG. 1 is a block diagram of an optical disk drive controlling spherical aberration correction according to the invention.

FIG. 1 is a block diagram of an optical disk drive 100 controlling spherical aberration correction according to the invention. The optical disk drive 100 comprises a spherical aberration correction module 110, a collimator lens actuator 106, and a collimator lens 112 in a pick up head 108. Location of the collimator lens 112 is adjusted for spherical aberration correction, so as to focus a laser beam emitted by a pickup head of the optical disk drive 100 on the surface of an optical disk 120. In one embodiment, the optical disk 120 is a High-Definition DVD (HD-DVD) or a Blu-ray Disk (BD). The collimator lens actuator 106 generates pulse signals to drive a stepping motor moving the collimator lens 112, thus controlling motion of the collimator lens 112.

The spherical aberration correction module 110 comprises a control unit 102 and a timer unit 104. The control unit 102 controls the collimator lens actuator 106, so as to move the collimator lens 112 to a target position for spherical aberration correction. The timer unit 104 stores a timer value and decreases the timer value as time elapses. Because the stepping motor generates additional heat during operation, temperature of the system is increased when the collimator lens 112 is frequently moved for spherical aberration correction. To avoid system mechanism damage due to increased temperature, every time after the collimator lens 112 is moved, the collimator lens 112 is kept stationary for a period of time to cool the stepping motor. Thus, temperature of the system does not rapidly increase to harm the system mechanism.

Figure 2:
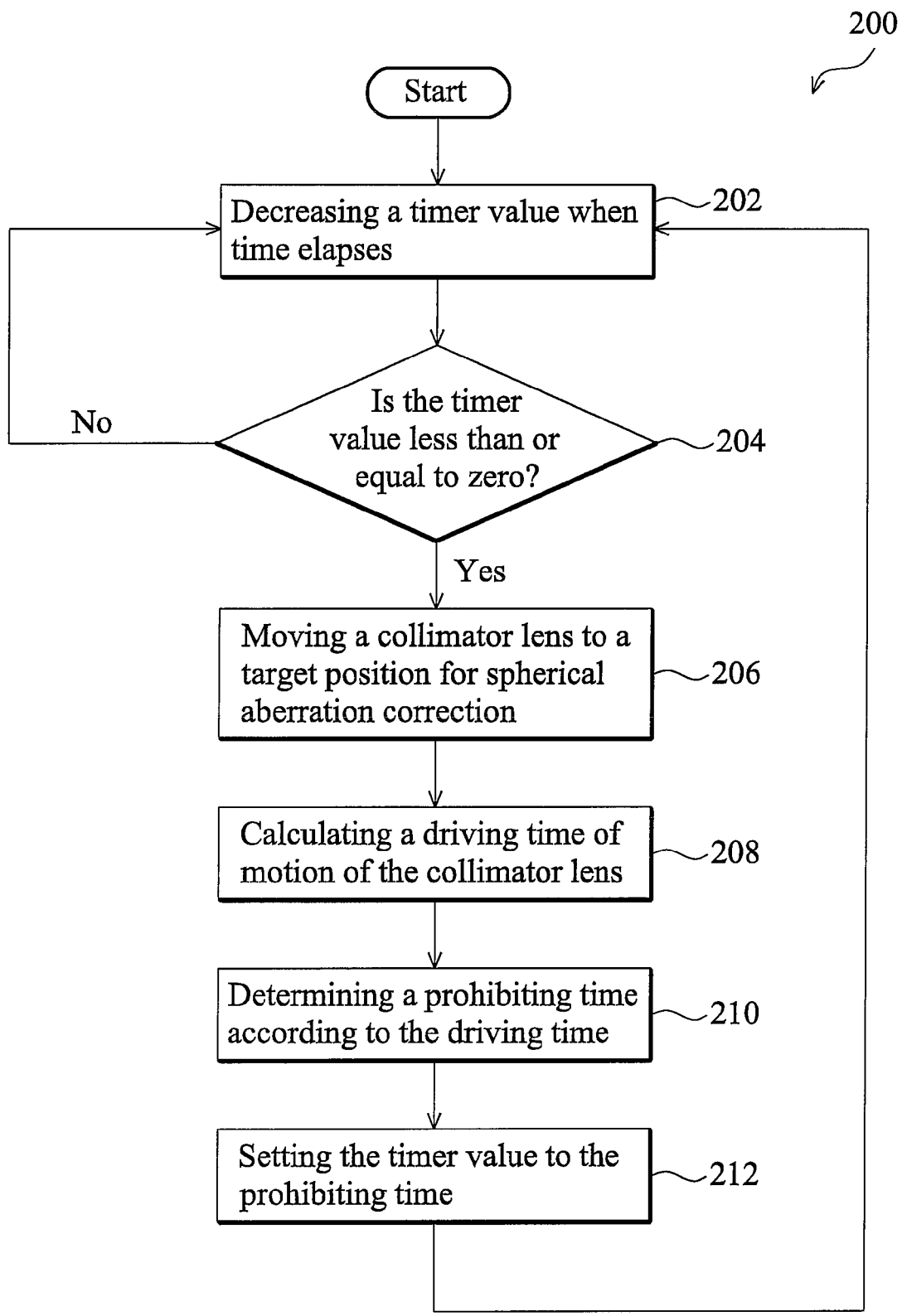
FIG. 2 is a flowchart of a method for controlling spherical aberration correction according to the invention.

FIG. 2 is a flowchart of a method 200 for controlling spherical aberration correction according to the invention. After correcting spherical aberration at the previous target position, the timer unit 104 continues to decrease a timer value stored therein as time elapses (step 202). Every time when the control unit 102 intends to move the collimator lens 112, the control unit 102 detects the timer value stored in the timer unit 104 in advance (step 204). If the timer value is greater than zero, the collimator lens 112 is kept stationary, and the control unit 102 cannot control the collimator lens actuator 106 to move the collimator lens 112. The timer unit 202 continues to count down the timer value. Only when the timer value is less than or equal to zero (step 204), the control unit 102 starts to move the collimator lens 112 to a target position for spherical aberration correction (step 206).

The control unit 102 then calculates a driving time of motion of the collimator lens 112 (step 208). The driving time is a measure of the time previously spent by the collimator lens 112 moving from an initial position to the target position for spherical aberration correction. In one embodiment, the collimator lens actuator 106 generates pulses with a constant pulse frequency to drive the stepping motor to move the collimator lens 112. Thus, to calculate the driving time, the control unit 102 first determines a number of pulses generated by the collimator lens actuator 106 to move the collimator lens 112 from the initial position to the target position, and then divides the pulse number by a pulse frequency to obtain the driving time. For example, if the pulse frequency is 1000 pulses per second and the pulse number is 100 pulses, the driving time is calculated to be 0.1 second (100/1000).

The control unit 102 then determines a prohibiting time according to the driving time (step 210). The longer the driving time in which the stepping motor operates, the more heat generated by the stepping motor, and the longer the prohibiting time is required to dissipate the generated heat. The prohibiting time is thus determined in proportion to the driving time. In one embodiment, the control unit 102 multiplies the driving time by a predetermined ratio to obtain the prohibiting time. For example, if the driving time is 0.1 second and the predetermined ratio is 0.8, the prohibiting time is determined to be 0.08 second (0.1×0.08).

After the prohibiting time is determined, the control unit 102 sets the timer value of the timer unit 104 for the prohibiting time (step 212). The timer unit 104 then starts to decrease the timer value with the elapsing of time (step 202). Because the control unit 102 cannot move the collimator lens 112 until the timer value of the timer unit 104 is deceased to zero at step 204, the stepping motor does not operate during the prohibiting time, and heat generated by the stepping motor is dissipated during the prohibiting time to ensure the system temperature from rapidly increasing. Thus, mechanism of the optical disk drive 100 is not damaged due to high system temperature induced by stepping motor operation for spherical aberration correction.

Figure 3A:
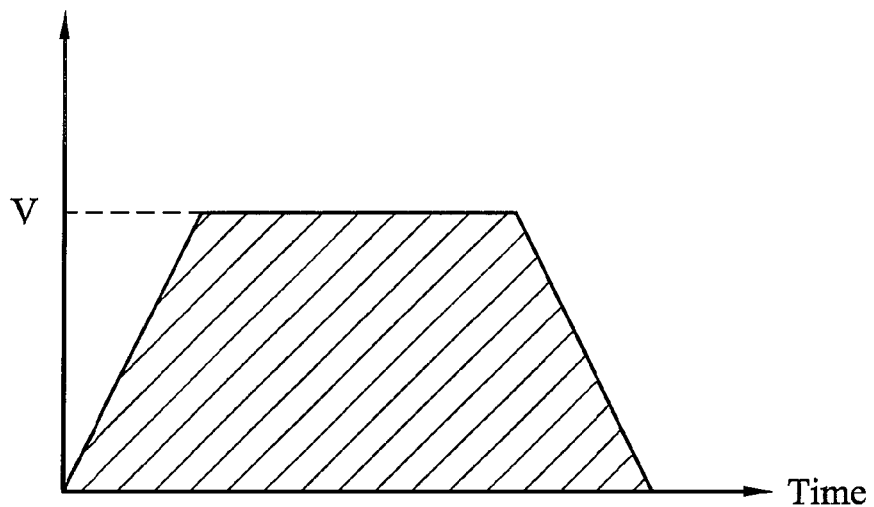
FIGS. 3A and 3B show different types of a motion speed of a collimator lens.
Figure 3B:
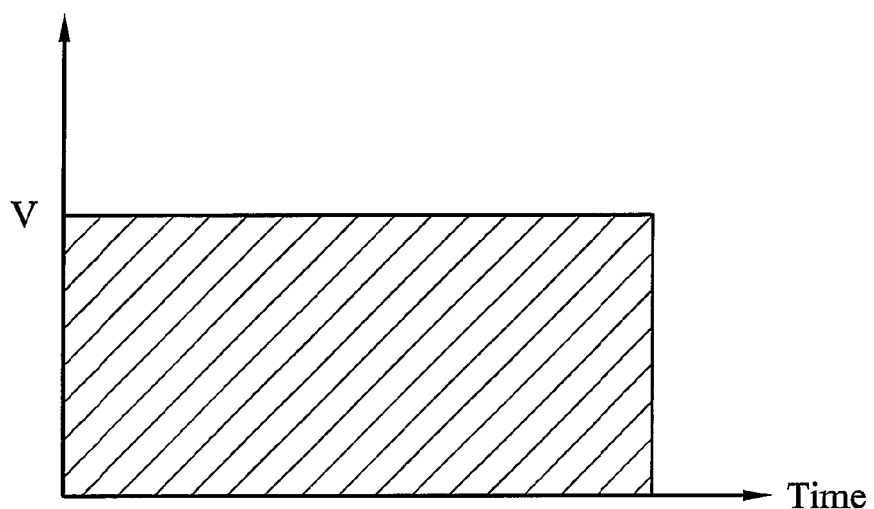

There are two different types about moving speed of the collimator lens 112 for spherical aberration correction at step 206, and calculation of the prohibiting time at step 210 may differ in the two different types. For example, a speed of the collimator lens 112 varies with time as shown in FIG. 3A, or the collimator lens 112 may be moved with a constant speed as shown in FIG. 3B. In the variant speed type of FIG. 3A, the increased temperature of the system may be not in proportion to the elapsed time directly, and an increased temperature of the system is first measured, and the prohibiting time is then determined by multiplying the increased temperature by a predetermined ratio. In the constant speed type of FIG. 3B, the increased temperature of the system is proportion to the elapsed time directly, and the prohibiting time is determined by multiplying the driving time by a predetermined ratio.

Figure 4:
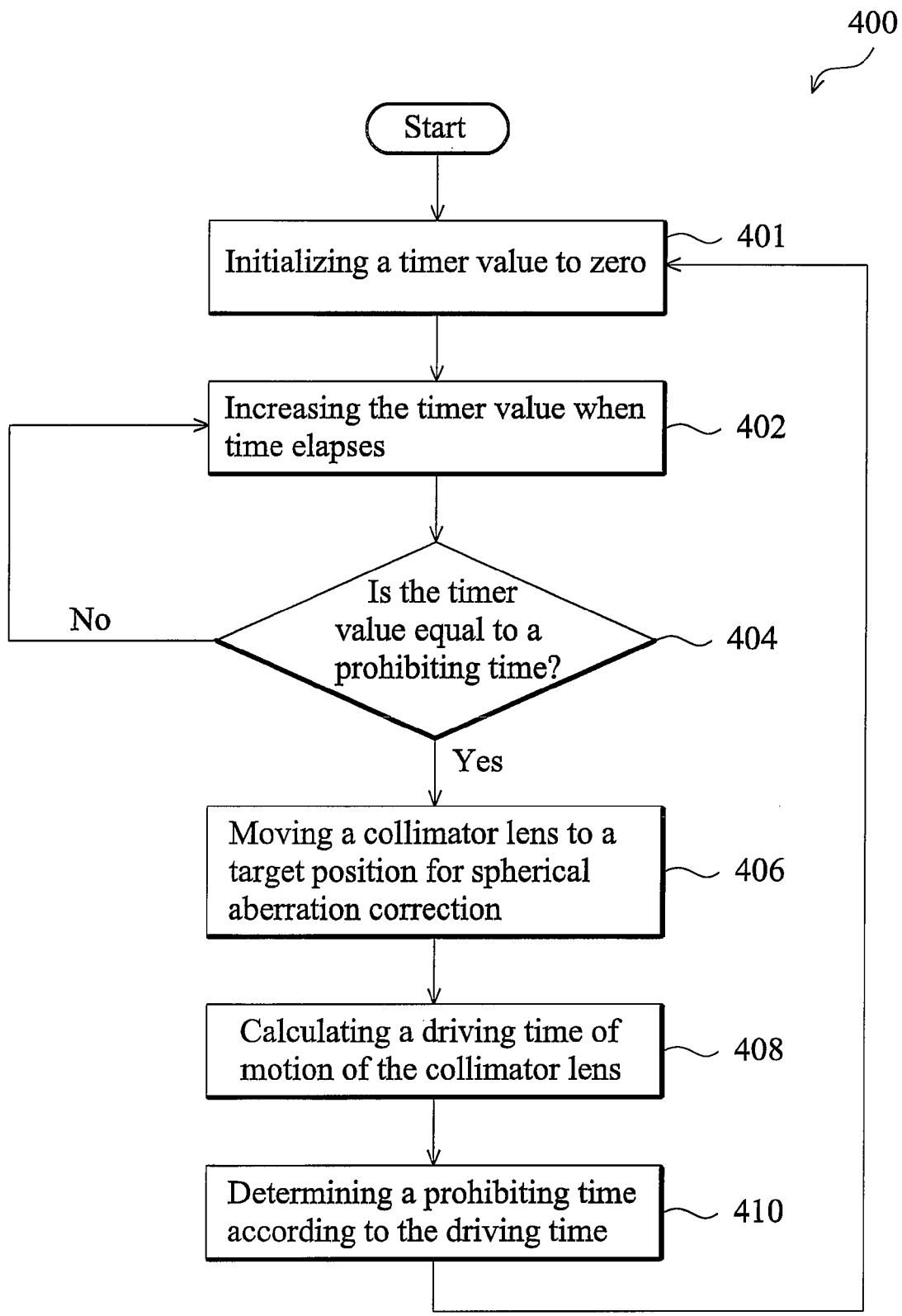
FIG. 4 is a flowchart of a method for controlling spherical aberration correction according to the invention.

Referring to FIG. 4, a flowchart of another method 400 for controlling spherical aberration correction according to the invention is shown. The timer unit 104 can counts an elapsed time by increasing a timer value rather than decreasing a timer value. After correcting spherical aberration at the previous target position, the timer unit 104 first initializing a timer value to zero (step 401). The timer unit 104 then increases the timer value when time elapses (step 402). Assume that a prohibiting time has been determined. The control unit 102 then determines whether the timer value counted by the timer unit 104 is equal to the prohibiting time (step 404).

When the timer value counted by the timer unit 104 is equal to the prohibiting time, the control unit 102 starts to move the collimator lens 112 for spherical aberration correction (step 406). The control unit 102 then calculates a driving time of motion of the collimator lens in the spherical aberration correction (step 408). After spherical aberration correction is completed, the control unit 102 then determines a prohibiting time according to the driving time (step 410). Finally, the timer unit 104 clears the timer value to zero again (step 401), and the control unit 102 will not start a next spherical aberration correction until the timer value is increased to the prohibiting time value.

The invention provides a method for controlling spherical aberration correction for an optical disk drive. A prohibiting time is first determined according to a driving time of motion of a collimator lens. The collimator lens is then prevented from moving until the prohibiting time elapses. Thus, a stepping motor for moving the collimator lens for spherical aberration correction is temporarily halted during the prohibiting time to dissipate heat, and temperature is not increased to damage system mechanism.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling spherical aberration correction for an optical disk drive, comprising:
   moving a collimator lens to a first target position for spherical aberration correction;
   calculating a driving time of motion of the collimator lens;
   determining a prohibiting time according to the driving time; and
   preventing the collimator lens from moving until the prohibiting time elapses.

2. The method as claimed in claim 1, wherein the prevention of the collimator lens from moving comprising:
   setting a timer value for the prohibiting time;
   decreasing the timer value as time elapses; and
   moving the collimator lens to a second target position for spherical aberration correction when the timer value is equal to or less than zero.

3. The method as claimed in claim 1, wherein the prevention of the collimator lens from moving comprising:
   initializing a timer value to a zero value;
   increasing the timer value as time elapses; and
   moving the collimator lens to a second target position for spherical aberration correction when the timer value is equal to or greater than the prohibiting time.

4. The method as claimed in claim 1, wherein the calculation of the driving time comprises:
- determining a pulse number for a collimator lens actuator moving the collimator lens to the first target position; and
- dividing the pulse number by a pulse frequency of the collimator lens actuator to obtain the driving time;
- wherein the collimator lens actuator generates pulses with the pulse frequency to move the collimator lens.

5. The method as claimed in claim 1, wherein the determination of the prohibition time comprises multiplying the driving time by a predetermined ratio to obtain the prohibiting time.

6. The method as claimed in claim 1, wherein the prohibition time is determined in proportion to the driving time.

7. The method as claimed in claim 1, wherein the optical disk drive moves the collimator lens for spherical aberration correction while accessing Blu-ray Discs (BD) or High-Definition DVDs (HD DVD).

8. An apparatus for controlling spherical aberration correction for an optical disk drive, comprising:
- a control unit, calculating a driving time of motion of the collimator lens, determining a prohibiting time according to the driving time, setting a timer value of a timer unit for the prohibiting time, and controlling a collimator lens actuator to move the collimator lens for spherical aberration correction when the timer value is equal to or less than zero; and
- the timer unit, coupled to the control unit, decreasing the timer value as time elapses after the timer value is set to the prohibiting time.

9. The apparatus as claimed in claim 8, wherein to calculate the driving time, the control unit determines a pulse number for the collimator lens actuator to move the collimator lens, and divides the pulse number by a pulse frequency of the collimator lens actuator to obtain the driving time, wherein the collimator lens actuator generates pulses with the pulse frequency to move the collimator lens.

10. The apparatus as claimed in claim 8, wherein the control unit multiplies the driving time by a predetermined ratio to obtain the prohibiting time.

11. The apparatus as claimed in claim 8, wherein the control unit determines the prohibition time in proportion to the driving time.

12. The apparatus as claimed in claim 8, wherein the control unit controls the collimator lens actuator to move the collimator lens for spherical aberration correction while the optical disk drive accesses Blu-ray Discs (BD) or High-Definition DVDs (HD DVD).

13. An optical disk drive, comprising:
- a collimator lens actuator, moving a collimator lens for spherical aberration correction; and
- a spherical aberration correction module arranged to calculate a driving time of motion of the collimator lens, determining a prohibiting time according to the driving time, and preventing the collimator lens from moving until the prohibiting time elapses.

14. The optical disk drive as claimed in claim 13, wherein the spherical aberration correction module comprises:
- a control unit, calculating the driving time, determining the prohibiting time according to the driving time, setting a timer value of a timer unit for the prohibiting time, and preventing the collimator lens from moving until the timer value is equal to or less than zero; and
- the timer unit, decreasing the timer value as time elapses.

15. The optical disk drive as claimed in claim 13, wherein the spherical aberration correction module comprises:
- a control unit, calculating the driving time, determining the prohibiting time according to the driving time, initializing a timer value of a timer unit to a zero value, and preventing the collimator lens from moving until the timer value is equal to or greater than the prohibiting time; and
- the timer unit, increasing the timer value as time elapses.

16. The optical disk drive as claimed in claim 14, wherein to calculate the driving time, the control unit determines a pulse number for a collimator lens actuator to move the collimator lens, and divides the pulse number by a pulse frequency of the collimator lens actuator to obtain the driving time, wherein the collimator lens actuator generates pulses with the pulse frequency to move the collimator lens.

17. The optical disk drive as claimed in claim 13, wherein the spherical aberration correction module multiplies the driving time by a predetermined ratio to obtain the prohibiting time.

18. The optical disk drive as claimed in claim 13, wherein the spherical aberration correction module determines the prohibition time in proportion to the driving time.

19. The optical disk drive as claimed in claim 13, wherein the collimator lens actuator moves the collimator lens for spherical aberration correction while the optical disk drive accesses Blu-ray Discs (BD) or High-Definition DVDs (HD DVD).

* * * * *